(No Model.) 3 Sheets—Sheet 1.
N. C. STILES.
MACHINE FOR CUTTING WIRE TO LENGTHS.
No. 458,780. Patented Sept. 1, 1891.
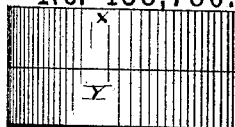
Fig. 1
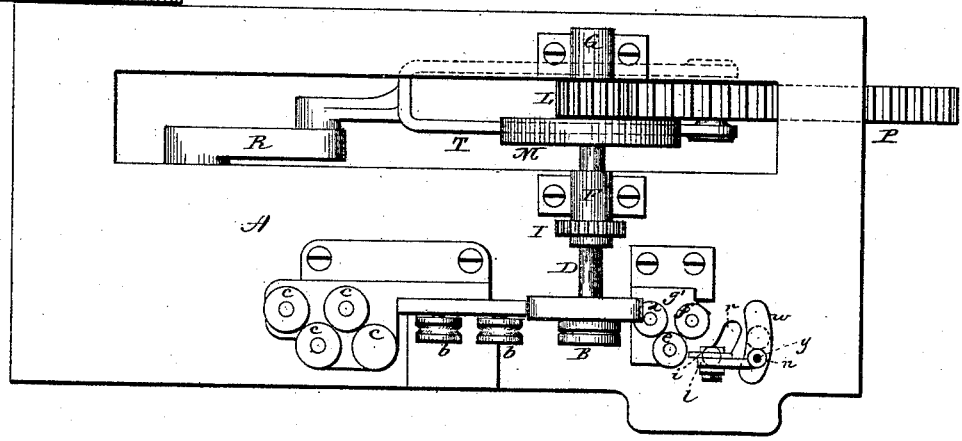
Fig. 2
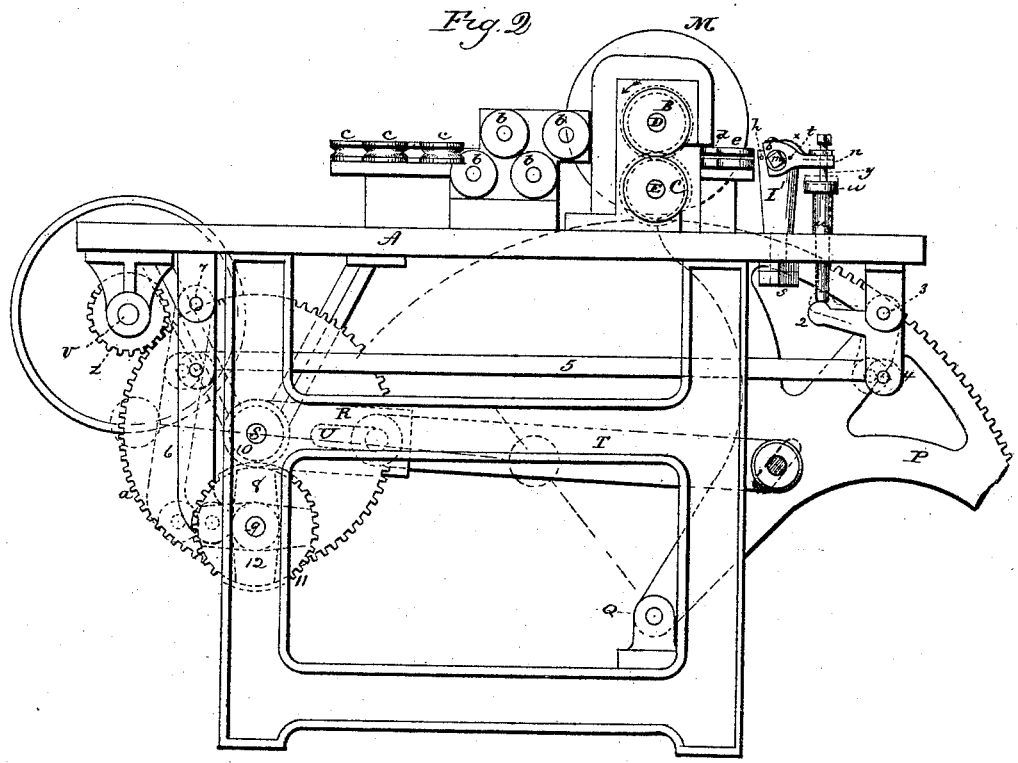
Witnesses: Norman C. Stiles, Inventor
By atty.

(No Model.) 3 Sheets—Sheet 2.
N. C. STILES.
MACHINE FOR CUTTING WIRE TO LENGTHS.
No. 458,780. Patented Sept. 1, 1891.
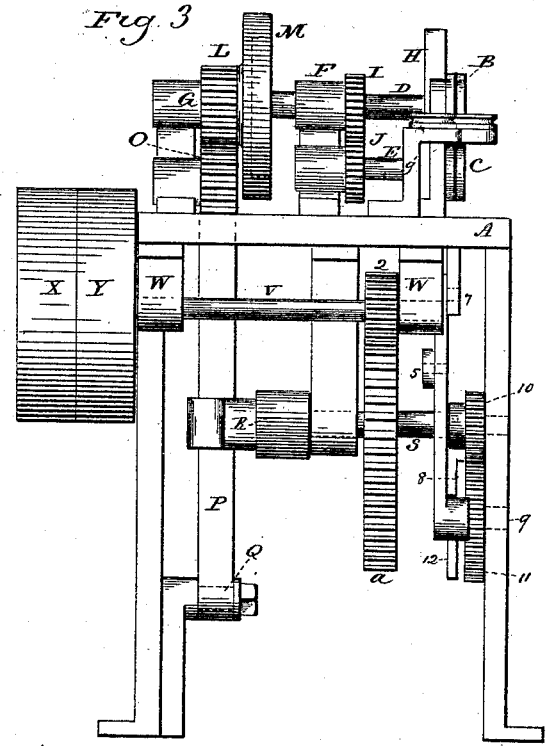
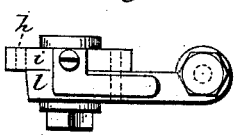
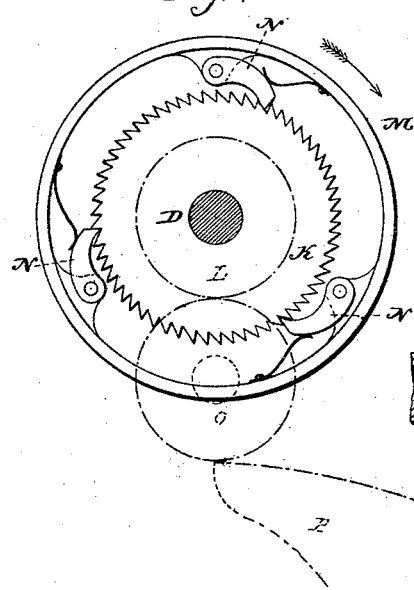
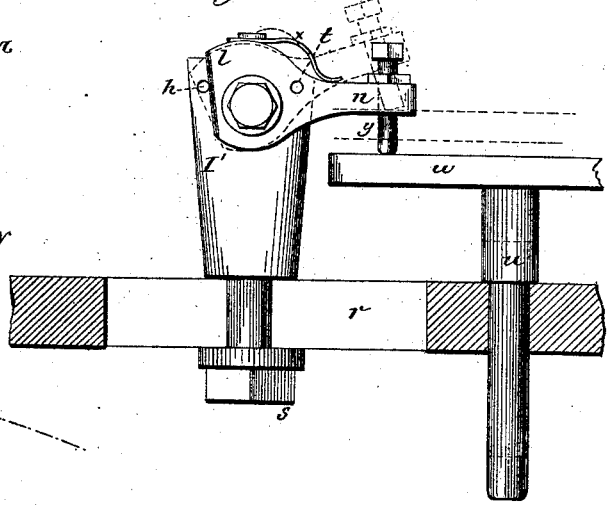

(No Model.) 3 Sheets—Sheet 3.
N. C. STILES.
MACHINE FOR CUTTING WIRE TO LENGTHS.
No. 458,780. Patented Sept. 1, 1891.
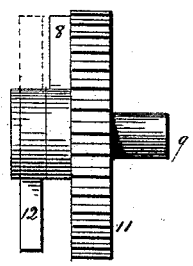
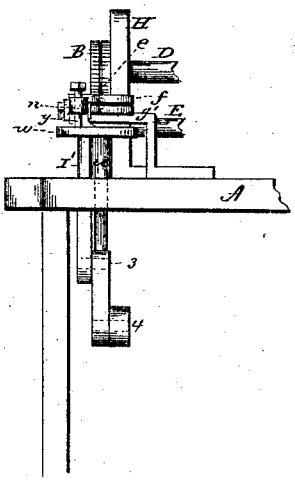
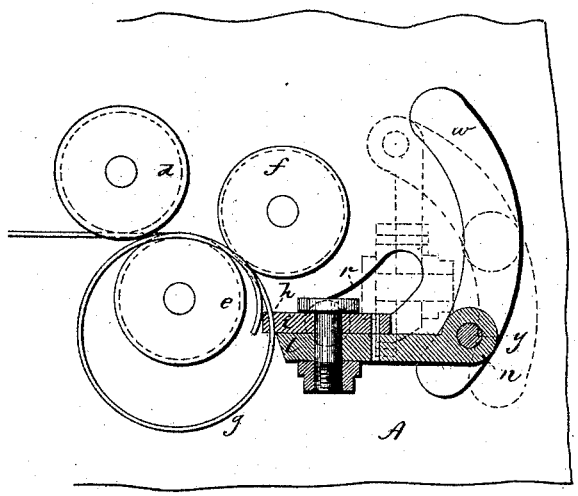
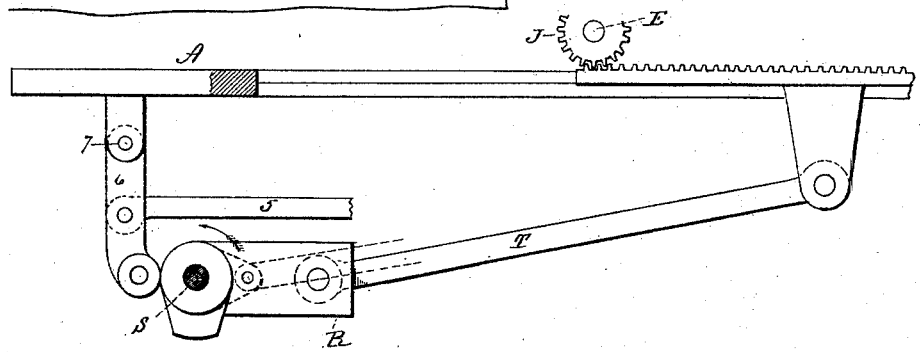

UNITED STATES PATENT OFFICE.

NORMAN C. STILES, OF MIDDLETOWN, CONNECTICUT.

MACHINE FOR CUTTING WIRE TO LENGTHS.

SPECIFICATION forming part of Letters Patent No. 458,780, dated September 1, 1891.

Application filed April 29, 1889. Serial No. 309,040. (No model.)

*To all whom it may concern:*

Be it known that I, NORMAN C. STILES, of Middletown, in the county of Middlesex and State of Connecticut, have invented new Improvements in Machines for Cutting Wire to Lengths; and I do hereby declare the following, when taken in connection with accompanying drawings and the letters of reference marked thereon, to be a full, clear, and exact description of the same, and which said drawings constitute part of this specification, and represent, in—

Figure 1, a top or plan view of the machine complete; Fig. 2, a front side view of the same; Fig. 3, an end view of the machine, looking from the left of Figs. 1 and 2; Fig. 4, a face view of the ratchet K and its head; Fig. 5, a face view of the cutting mechanism; Fig. 6, a top view of the cutting mechanism; Fig. 7, a top or plan view of the cutting mechanism with the bending-rolls, showing a portion of the bed; Fig. 8, a side view of the cutter-cams and gear; Fig. 9, a partial end view looking from the right of Figs. 1 and 2, and Fig. 10 a modification.

This invention relates to an improvement in machines employed for preparing wire for articles of manufacture and in which predetermined lengths are required. In some cases these lengths of wire are required to be straight, in others curved into ring shape or segment shape.

The wire as produced by wire-manufacturers and as it comes to the consumer requires to be straightened for use. After such straightening the wire is cut to the requisite length. In some cases the pieces thus cut are used straight. In other cases they are of segment shape, as for the bails of pails. In other cases they are of full circle, as for the wiring of articles of circular shape.

The object of this invention is to construct a machine in which the wire as it is received from the manufacturer may be straightened and delivered from the machine cut to the required lengths, straight, if desirable, or curved and cut to the required length, be it a full circle, more than a circle, or less than a circle; and the invention consists in the construction and combination of mechanism, as hereinafter described, and more particularly recited in the claims.

A represents the bed of the machine; B C, a pair of feed-rolls arranged upon shafts D E, the shafts supported in suitable bearings F, G, and H, the one shaft D being directly above the other shaft E, as seen in Figs. 2 and 3. The rolls B and C are grooved corresponding to the wire which is to be operated upon. The rolls are held in working contact in the usual manner for such feed-rolls, not necessary to be particularly described in this application. The shaft D of the roll B, being the driven shaft, communicates corresponding rotation to the shaft E by means of a pinion I on the shaft D working into a like pinion J on the shaft E, as seen in Fig. 3, and so that the active rotation of the said rolls is in the direction of the arrow, Fig. 2. An intermittent rotation is imparted to the shaft D, according to the length of wire required, and so that in working the rolls B C operate upon the wire to deliver the requisite length and then cease their rotation. This intermittent rotation is produced by the following instrumentalities: To the shaft D a toothed ratchet K is rigidly fixed. (See Fig. 4 and in broken lines, Fig. 3.) Loose upon the shaft D is a pinion L, which carries a concentric head M, which surrounds the ratchet K, as seen in Figs. 3 and 4. The head M carries one or more spring-pawls N, which are adapted to engage the teeth of the ratchet K in one direction, but leave it free in the opposite direction, and so that as the pinion L is rotated in the direction indicated by the arrow, Fig. 4, the pawls of the head will engage the teeth of the ratchet and impart to the shaft D a corresponding rotation; but when the rotation of the said pinion L in that direction ceases then the rotation of the shaft D ceases, and upon the return of the pinion L to rotate the head M in the opposite direction the pawls will escape the teeth of the ratchet without effect thereon. The pinion L is represented in broken lines, Fig. 4. Below the pinion L is a second pinion O, which works into the pinion L, and with this pinion O a segment-gear P engages, the said segment being hung below upon an axle Q and so that the segment may swing thereon in a plane at right angles to the axis of the pinion O, and as the said segment swings in one direction it will impart rotation to the pinion O, and thence to the head M in the corresponding direction, and as the segment returns a corresponding reverse rotation will be imparted to the pinion L. A vibratory movement is imparted to the segment P by means of a crank R on a shaft S, the said shaft being supported in suitable bearings in the frame of the machine. A pitman T connects the said crank and segment, and so that the revolution of the said crank will impart a corresponding vibration to the segment P, as indicated in broken lines, Fig. 2. This crank may be made adjustable in the usual manner for adjustable cranks, here represented as by means of a slot U in the crank, in which the crank-pin is arranged so as to slide nearer to or farther from the center, as the stroke of the segment is required to be less or greater. As here represented, the crank receives its rotation from a driving-shaft V, supported in bearings W, and on which tight and loose pulleys X and Y are arranged in the usual manner for communicating power to shafts. On this driving-shaft a pinion Z works into a corresponding gear $a$ on the shaft S.

In rear of the feed-rolls B C, the straightening apparatus is arranged. As here represented, this straightening apparatus is of common construction and consists of two series of rolls $b\ b$ and $c\ c$, the one series being arranged to revolve in a plane at right angles to the other, and the rolls grooved. The operation of this straightening apparatus is too well known to require detailed description. The wire is run through the straightening device, thence delivered to the feed-rolls B C, and under their revolution the wire is drawn through the straightening devices and delivered straight from the rolls B C. If the wire is required in straight lengths, it is cut off at the required length; but if it is required to be curved to segment or circular shape a bending apparatus is introduced to operate upon the wire after it passes from the feed-rolls B C. This bending apparatus consists of three rolls $d$, $e$, and $f$, arranged upon a supporting-block $g'$, which is fixed to the bed of the machine, and, as seen in Figs. 1 and 3, these rolls $d$, $e$, and $f$ are arranged upon vertical axes, their peripheries grooved corresponding to the wire and the plane of the grooves, in the plane of the groove between the feed-rolls, and as seen in Fig. 2, so that a straight wire passing from between the feed-rolls B C will enter between the rolls $d\ e$ and thence pass between the rolls $e\ f$. These rolls are represented in Fig. 7 enlarged. Their axes are arranged in relation to each other so that the roll $f$ forms a deflecting-roll to turn the wire out of its direct curve. This is a common expedient in bending wires, and arranged as seen in Fig. 7 the effect upon the straight wire coming to these rolls is to curve it, as represented in Fig. 7, $g$ representing the curved wire, which in this case is represented as forming a full ring. If the curving of the wire is not required, then the bending-rolls $d\ e\ f$ are removed, so as to allow the wire to pass straight from the feed-rolls.

To cut the wire when the requisite length has been delivered, the wire runs through a corresponding hole $h$ in a vertical post $i$. (See Figs. 5 and 6.) On this post a cutter $l$ is hung upon an axis $m$, so as to swing in the plane of the post and so that its edge will work across the hole $h$, as represented in broken lines, Fig. 5. The post I' is located so as to bring the hole $h$ directly in the path of the advancing wire. The cutter is attached to or formed upon an arm $n$, which serves as a lever to operate the cutter. As represented in Figs. 1, 2, and 7, the post stands in a plane parallel with the straight wire, but so that the curved wire will pass directly through the hole $h$ in the post. At the proper time the cutter swings across the hole $h$, as indicated in broken lines, Figs. 5 and 7, and cuts off the wire.

In order that the cutter may be adjusted to different curves or to the completely-straight wire, the post I' is arranged in a segment-shaped slot $r$, (see Fig. 7,) firmly secured in the said slot by a nut $s$ upon the under side of the bed. Under this arrangement the post may be moved to any desired position and set parallel with the straight wire, as represented in Fig. 7, for curved wire, or at right angles to the run of the wire, as represented in broken lines in Fig. 7, to cut the straight wire; or it may be set at any intermediate point, according to the position where the cut is required to be made. When set at right angles to cut the straight wire, for convenience the post and cutter-lever are constructed with a corresponding opening $t$ on the side of the axis opposite the opening $h$, and as represented in broken lines, Fig. 7, so that working upon a straight wire the wire runs through the opening $t$ and at the proper time is cut off by the swinging movement of the cutter-lever.

To impart the cutting movement to the lever L in any position where it may be placed, a vertically-sliding post $u$ is arranged through the bed, and on this post is a horizontal segment $w$. Through the cutter-lever an adjusting-screw $y$ extends, adapted to bear upon the segment $w$, and so that as the post $u$ is raised the cutter will be correspondingly turned upon its axis, and then as the post returns a spring $x$ will return the cutter-lever. The post $u$ extends below the bed and rests upon one arm 2 of a lever hung upon an axis 3 below the bed, the other arm 4 of the lever extending downward, and to which one end of a connecting-rod 5 is hung, the other end of the rod 5 being hung upon a vertically-swinging lever 6, supported upon an axis 7. The lever 6 is operated upon by a cam 8 on a counter-shaft 9. This counter-shaft is driven by a pinion 10 on the shaft S, working into a corresponding gear 11 on the shaft 9. As represented, the gear 11 is twice the size of the pinion 10, so that the said gear 11 will receive a half-revolution to each full revolution of the pinion 10 and the crank R, which is fixed upon the same shaft as the pinion 10. A second cam 12 is therefore arranged upon the same shaft, these two cams being diametrically opposite each other, as seen in Fig. 2, and as also represented in Fig. 8. These cams are made independent of each other, as represented in Fig. 8, so that they may be independently set upon the shaft which carries them, as occasion may require, or either may be removed and the other retained. As these cams revolve they in turn operate upon the lever 6 to throw it outward, as represented in broken lines, Fig. 2, such swinging movement of the lever 6 causing the post $u$ to rise and turn the cutter, as before described. The cams are set so as to operate the cutter upon the return of the segment and as it approaches its extreme return position. As represented in Fig. 2, the segment stands in its extreme forward position. From this position the segment will be drawn rearward, and during such movement of the segment the feed-rolls will revolve and advance the wire accordingly. After the requisite length of wire has been thus delivered the crank R has reached its opposite extreme, and then the segment P returns, and during its return or as it approaches its extreme return movement one of the cams 8 or 12 will operate upon the lever 6 and produce the cut, as before described, the cut being completed before the segment commences its next advance movement, so that the wire actually rests while the cutting operation is being performed. If the length of cut required be twice the throw of the segment, so that the two movements of the segment will produce the requisite length before cutting, then one of the cams 8 or 12 will be removed, the other remaining to produce the cut. This result is attained because of the proportion of the pinion 10 and gear 11.

The illustration of the one-to-two revolution of the cam 11 will be sufficient to enable others skilled in the art to vary the time for the cutting operation, as occasion may require. The length of stroke may be varied by adjusting the crank-pin of the crank R or by adjusting the connection between the connecting-rod and the segment. The latter may be done by constructing the segment with a radial slot, as indicated in broken lines, and so that the pivot between the connecting-rod and the segment may be moved nearer to or farther from the center of motion of the segment. The swinging movement may be otherwise imparted to the cutter—say as by a cam arranged directly upon the shaft S, as represented in Fig. 10, which illustration will be sufficient to enable others skilled in the art to provide suitable means for operating the cutter; or the connection with the cutter-arm may be made to a crank on the shaft S, as seen in broken lines, Fig. 10, the crank being timed so as to operate during the rest of the feed-rolls, it only being essential to the invention that the cutter shall be arranged to operate at the proper time and during the return movement of the feeding mechanism.

While I p efer the segment P as the best means for imparting the intermittent rotating movement to the feed-rolls, a straight rack may be employed, as represented in Fig. 10, with good results, the rack imparting rotation in one direction; but the shaft will be left free in the opposite direction, as before described.

While I prefer the intermittent rotation of the feed-rolls, as I have described, the adjustable cutter whereby the machine is adapted to producing wire cut to predetermined lengths, either straight or curved, may be employed in machines in which the feed is constant.

I claim—

1. The combination of a pair of feed-rolls B C, a cutter forward of said feed-rolls and adjustable to different planes with relation to the plane of said feed-rolls, bending-rolls between said feed-rolls and cutters, a pinion arranged loose upon the shaft of one of said feed-rolls, and a pawl and ratchet between said pinion and shaft, whereby the rotation of said pinion in one direction will be imparted to said shaft, but the shaft will be left free in the return or backward rotation of said pinion, with mechanism, substantially such as desribed, to impart such backward and forward rotation to said pinion, substantially as specified.

2. The combination of the feed-rolls B C, geared together, the cutter-post $i$, adjustably supported in a segment-shaped slot $r$ and having an opening through which the wire may pass, vertically-sliding posts $u$, carrying the horizontal segment $w$, a cutter-lever hung upon the said cutter-post and adapted to work across said opening in the post as a cutter, said lever adapted to bear upon said segment $w$, with bending-rolls $d\ e\ f$ between said feed-rolls and the cutter-post, and mechanism, substantially such as described, to impart vertical movement to said post, substantially as and for the purpose described.

3. The combination of the feed-rolls B C, geared together, the ratchet K, fixed to the shaft of one of said rolls, a pinion L, loose upon the same shaft on which said ratchet is arranged, a head M in connection with said pinion L, constructed so as to revolve therewith, one or more spring-pawls on said head adapted to engage the said ratchet in one direction, but leave it free in the opposite direction, mechanism, substantially such as described, to impart a backward-and-forward rotation to said pinion, a cutter forward of said feed-rolls, and mechanism, substantially such as described, to operate said cutter during the backward movement of said pinion, substantially as described.

NORMAN C. STILES.

Witnesses:
FRED C. EARLE,
J. H. SHUMWAY.